US009740946B2

(12) United States Patent
Varkuti et al.

(10) Patent No.: US 9,740,946 B2
(45) Date of Patent: Aug. 22, 2017

(54) IDENTIFICATION METHOD BASED ON CONNECTIVITY PROFILES

(71) Applicant: Brainlab AG, Munich (DE)

(72) Inventors: Bálint Varkuti, München (DE); Rainer Lachner, München (DE)

(73) Assignee: Brainlab AG, Munich (DE)

( * ) Notice: Subject to any disclaimer, the term of this patent is extended or adjusted under 35 U.S.C. 154(b) by 68 days.

(21) Appl. No.: 14/903,806

(22) PCT Filed: Jul. 8, 2013

(86) PCT No.: PCT/EP2013/064371
§ 371 (c)(1),
(2) Date: Jan. 8, 2016

(87) PCT Pub. No.: WO2015/003732
PCT Pub. Date: Jan. 15, 2015

(65) Prior Publication Data
US 2016/0155005 A1    Jun. 2, 2016

(51) Int. Cl.
*G06K 9/00* (2006.01)
*G06K 9/46* (2006.01)
(Continued)

(52) U.S. Cl.
CPC ....... *G06K 9/00885* (2013.01); *G06K 9/4638* (2013.01); *G06K 9/627* (2013.01);
(Continued)

(58) Field of Classification Search
CPC . G06T 2207/10092; G06T 2207/20076; G06T 2207/20081; G06T 2207/30016;
(Continued)

(56) References Cited

U.S. PATENT DOCUMENTS

2008/0193918 A1* 8/2008 Wickersham ......... C12N 15/86
435/5
2016/0272940 A1* 9/2016 Chung ................... A61K 35/30

FOREIGN PATENT DOCUMENTS

WO    2004051568    6/2004

OTHER PUBLICATIONS

Henrik Skibbe et al; "Dense Rotation Invariant Brain Pyramids for Automated Human Brain Parcellation", nformatik 2011,41; pp. 1-15, XP055106200, Web Oct. 1, 2011.*

(Continued)

*Primary Examiner* — Gregory F Cunningham
(74) *Attorney, Agent, or Firm* — Middleton Reutlinger

(57) ABSTRACT

The present invention relates to a medical data processing method for identifying an entity of the nervous system, in particular the brain, of a patient, wherein the method is designed to be executed by a computer and comprises the following steps: a) acquiring target connectivity data comprising target connectivity information about the probability of a target entity being connected to other entities of the nervous system; b) acquiring candidate connectivity data comprising candidate connectivity information about the probability of at least one candidate entity being connected to other entities of the nervous system; and c) determining similarity data for each of the at least one candidate entities on the basis of the candidate connectivity data and the target connectivity data, wherein the similarity data comprise similarity information about the similarity between the candidate entity and the target entity.

18 Claims, 2 Drawing Sheets

(51) Int. Cl.
G06K 9/62 (2006.01)
G06T 7/11 (2017.01)
G06T 7/187 (2017.01)

(52) U.S. Cl.
CPC ......... *G06K 9/6232* (2013.01); *G06K 9/6277* (2013.01); *G06T 7/11* (2017.01); *G06T 7/187* (2017.01); *G06K 2009/00932* (2013.01); *G06T 2207/10092* (2013.01); *G06T 2207/20076* (2013.01); *G06T 2207/20081* (2013.01); *G06T 2207/30016* (2013.01)

(58) Field of Classification Search
CPC ....... G06T 7/187; G06T 7/11; G06K 9/00885; G06K 9/6232; G06K 9/627; G06K 9/6277; G06K 2009/00932; G06K 9/4638
USPC ........................................................ 382/128
See application file for complete search history.

(56) References Cited

OTHER PUBLICATIONS

Henrik Skibbe et al; "Dense Rotation Invariant Brain Pyramids for Automated Human Brain Parcellation", Informatik 2011, 41; pp. 1-15, XP055106200, Web Oct. 1, 2011.
European Patent Office; International Search Report for corresponding application PCT/EP2013/064371, pp. 1-2, Rijswijk, Netherlands. Mar. 17, 2014.

* cited by examiner

IDENTIFICATION METHOD BASED ON CONNECTIVITY PROFILES

The present invention relates to the technical field of identifying an anatomical structure in a medical data set.

In medical procedures such as image-guided surgery (IGS) or radiotherapy, it is desirable to know the position of a specific anatomical structure in a medical image of the body of a patient to be treated. For example, the medical personnel may wish to associate a visually identified part of the actual body with a specific image feature representing said part of the actual body, in order to determine a location or in on a particular patient's body at which the medical procedure is to be carried out.

Certain brain structures, such as for example the subthalamic nucleus or the habenula, are very small. The spatial resolutions of current brain-imaging techniques range between 0.3 mm and 1 mm for the voxel edge length and are therefore only able to render such structures as a single voxel or a very small number of voxels. Correctly identifying such (sub-)voxel-sized structures is very challenging, specifically when surgery is being planned which will target these structures. Misplacing electrodes in deep brain stimulation, infusing pharmacological agents into the wrong brain area or removing/disconnecting the wrong anatomical region can have dramatic consequences for the patient.

One common way of identifying the location of such structures is to perform elastic fusion between a universal atlas containing the standard locations of the structures in question and the individual patient image. In such a procedure, a local tag or object from the atlas is superimposed onto the individual patient image, and it is assumed that the structure in question is located correctly by this procedure. In practice, however, the relative distances within an individual brain are variable, and the location of for example the subthalamic nucleus relative to the thalamus or the ventricle wall is not similar across all individuals, hence even the best mapping/fusion procedure may miss the correct placement of the structure in question by a few voxels. This can have dramatic consequences if very small structures are being targeted.

One problem to be solved by the invention is therefore that of providing an efficient and reliable method of identifying an anatomical structure in a medical data set. This problem is solved by the subject-matter of any of the appended independent claims. Advantages, advantageous features, advantageous embodiments and advantageous aspects of the present invention are disclosed in the following and contained in the subject-matter of the dependent claims. Different advantageous features can be combined in accordance with the invention, wherever technically expedient and feasible. Specifically, a feature of one embodiment which has the same or a similar function to another feature of another embodiment can replace said other feature, and a feature of one embodiment which adds an additional function to another embodiment can in particular be added to said other embodiment.

BRIEF DESCRIPTION OF AN EXAMPLE EMBODIMENT OF THE PRESENT INVENTION

In the following, a concise description of the present invention is given which is to be considered merely as an example and does not limit the invention to the features described in this section.

The present invention incorporates the realisation that any voxel in the brain can be characterised by its anatomical or functional connectivity profile. In the case of anatomical connectivity, probabilistic/deterministic tractography from any seed voxel can be used to estimate the probability that the voxel in question has a physical white-matter link to the other structures or voxels considered. The result of such tractography can be an adjacency matrix which describes the connectivity probability of each voxel to other voxels. Such a description can for example be expressed as a feature vector containing connectivity probabilities, wherein the dimensionality of the feature vector is equal to the number of structures/voxels considered, i.e. the complexity of the connectivity profile.

For many structures in the brain (including the subthalamic nucleus), the anatomical wiring/connectivity profile (for example, the connectivity profile between the subthalamic nucleus and the globus pallidus) is well-known, such that each voxel can be characterised as to whether or not it shows a sought connectivity profile. Since each point can be described using said feature vector, its position within the feature space is equal to the connectivity probabilities. The sought connectivity probabilities are known for a number of structures, in which case the Euclidian distance between the point within the feature space and the known anatomical connectivity profile of the structure to be identified can for example be used as a connectivity profile similarity/dissimilarity index. This index can be used to weigh voxels according to their probability of belonging to the structure in question, based on the prior-known and currently estimated connectivity profiles. This information can be used in combination with tissue segmentation or other logical query functionality (for example, the knowledge that the voxel to be identified is located within a certain region) to produce accurate probability maps and to optimise elastic fusion or other procedures such as deep brain stimulation or neurosurgery by introducing probability-based attractor fields.

GENERAL DESCRIPTION OF THE INVENTION

In this section, a general description of the features and embodiments of the present invention is given. The features described in the following constitute preferred and particular features of the invention.

In general terms, the invention can be referred to as a medical data processing method for identifying an entity of the nervous system, in particular the brain, of a patient, wherein the method is designed to be executed by a computer and comprises the following steps:

a) acquiring target connectivity data comprising target connectivity information about the probability of a target entity being connected to other entities of the nervous system;

b) acquiring candidate connectivity data comprising candidate connectivity information about the probability of at least one candidate entity being connected to other entities of the nervous system; and c) determining similarity data for each of the at least one candidate entities on the basis of the candidate connectivity data and the target connectivity data, wherein the similarity data comprise similarity information about the similarity between the candidate entity and the target entity.

In other words, a computer performs a method in which the connectivity of a target entity of the nervous system, in particular the brain, of a patient is acquired, wherein said target entity can be a voxel, a region or a structure within a data set, in particular an image data set of the nervous system or brain, respectively. What the connectivity pattern of a target region looks like is for example often known from scientific literature or previous experimental data. Such previous experimental data can be derived from tractography images obtained by performing diffusion tensor imaging (DTI) on one or more subjects.

In a second step, the computer acquires information about the connectivity between at least one candidate entity and other entities of the nervous system, which can also be obtained by DTI-based tractography. In this instance, the connectivity information is obtained for a particular patient, namely the patient for whom an entity of the nervous system is to be identified. The at least one candidate entity can be chosen automatically by a computer or manually by a surgeon, in accordance with their professional experience, the apparent similarity between the at least one candidate entity and the target entity, or other criteria. A plurality of candidate entities may be taken from a single 2D or 3D patient image.

In a third step, the similarity between the at least one candidate entity, respectively, and the target entity of a particular patient is determined. Criteria therefore have to be defined for assessing the similarity or dissimilarity between the at least one candidate entity and the target entity and for comparing a plurality of candidate entities in order to find the candidate entity which most likely represents the target entity, as described further below.

As already mentioned above, the connectivity information can comprise information about at least one of the anatomical connectivity probability, the functional connectivity probability or the effective connectivity probability. Anatomical connectivity may also be referred to as white-matter connectivity, since the diffusion of water in the white matter of the brain is anisotropic and follows predetermined directions defined by bundles of axons which provide a barrier to perpendicular diffusion and a path for parallel diffusion along the orientation of the nerve fibres. Examples of functional connectivity include EEG-extracted coherence, fMRI-based correlation, membership of the same independent component as that derived from ICA (independent component analysis) or the coherence of electrode recordings based on implanted grids. One example of effective connectivity would be fMRI-based Granger causality patterns. However, any suitable measure of connectivity could be used in connection with the present invention.

Preferably, the at least one candidate entity is constituted by a single voxel within a data set of the patient's nervous system. Consequently, the target entity can also be a single voxel within a previously acquired data set. However, it is also possible to compare the connectivity of whole regions or structures within data sets with each other by means of the present invention. If a plurality of candidate entities are compared with each other and with a target entity, these candidate entities are preferably taken from the same data set of the nervous system. The data set can be an image data set which is in particular obtained by DTI-tractography.

In accordance with a preferred embodiment of the present invention, a feature space is determined which comprises n dimensions for n connectivity features assigned to said target entity, wherein each of the features describes the connectivity probability between the target entity and another entity—which can also be a voxel, a region or a structure—within the same data set. A connectivity vector can also be determined for each of the at least one candidate entities and the target entity, wherein the connectivity vector comprises n dimensions for n connectivity features and is based on the connectivity information about the entity which is assigned to this vector.

Specifically, each entity can be characterised with respect to its connectivity pattern, which can be defined by a number (n) of connectivity features, such that it is possible to find the entity in the patient image which most likely corresponds to the target entity, i.e. which has the greatest similarity to the target entity.

Thus, in accordance with a preferred embodiment of the present invention, the determined similarity data comprise similarity information about the similarity between the target entity and the at least one candidate entity, more preferably the similarity between the connectivity vector assigned to the target entity and one or more connectivity vectors (respectively) assigned to the one or more candidate entities.

The similarity data are even more preferably determined by determining distance data which comprise distance information about the distance between the end points of the connectivity vectors in the feature space. Each candidate entity or voxel can be described as a point in the n-dimensional feature space, wherein each feature represents the probability of this entity or voxel being connected to another entity or voxel, and the connectivity pattern of the target entity defines another point in the feature space for the target entity which is known beforehand from previously acquired data, hence similarity data can be determined by determining distance data comprising distance information about the distance between the points in the feature space for each entity—specifically, the distance between the end points of the connectivity vectors starting from the common origin of the feature space and ending at the respective points for each entity.

The distance between the points for each entity is also preferably constituted by the Euclidian distance, wherein the similarity between the connectivity profile of a candidate entity and the target entity profile can be derived from this Euclidian distance. Alternatively, if the variance distribution of the connectivity pattern of the target region is known (for example, by analysing a plurality of subjects), then it is also possible to generate an alternative measure of distance, for example one which is weighted with a covariance matrix in the case of a Gaussian distribution of the positions in the feature space. The similarity between each candidate entity and the target entity can then be correlated with the similarity between the connectivity profile (the position in the feature space) of each of the candidate voxels and the connectivity profile (the position in the feature space) of the target entity.

The connectivity information acquired can comprise information about direct-path connectivity and/or indirect-path connectivity, i.e. it is possible to consider not only direct connections between two entities but also indirect connections, i.e. via other entities. In other words, the connectivity profile can also comprise a local cluster coefficient, local efficiency, degree, betweenness, local vulnerability or other relevant features. The connectivity information can also consider connections of interest, such as for example those in the brain which lead first to the thalamus and then back to the cortex.

In accordance with another preferred embodiment of the present invention, probability data are determined on the basis of at least one logical query which can be introduced and answered either manually or automatically and which can provide at least one criterion for considering and/or excluding one or more candidate entities. In this way, the final probability field for the probability that a candidate entity represents the target entity can be reduced, since some of the candidate entities can be excluded prior to the comparison with the target entity. Such queries can be based on spatial characteristics (such that for example only entities located in the left hemisphere are considered), orientation characteristics (such that for example only white matter for which the main diffusion direction is orientated in a predetermined direction is considered), integrity characteristics (such that for example only entities with a fractional anisotropy value above a predetermined value are considered), tissue characteristics (such that for example only grey matter, white matter or cerebrospinal fluid is considered) and status-related functional characteristics (such that for example only entities for which BOLD activation has been detected in response to a motor task or for which arterial spin labelling has detected sufficient regional cerebral blood flow in that location are considered) and/or trait-related functional characteristics (such that for example only entities for which magnetic resonance spectroscopy has detected stable concentrations of a given neurotransmitter at repeated times are considered).

The similarity data determined using the method according to the invention can also serve as a basis for a matching procedure, in particular an elastic fusion procedure, which is performed for example on an image data set of the nervous system of the patient or a map of the nervous system of a patient. The similarity data and/or connectivity information determined can for example be used for point fusion in order to support and improve elastic fusion processes or any other means of image registration or surgical/radiotherapy navigation, by being back-projected onto a patient image.

Other aspects of the present invention relate to: a program which, when running on a computer or when loaded on a computer, causes the computer to perform the method steps according to any one of the embodiments described above; a program storage medium on which the program is stored, in particular in a non-transitory form; a computer, in particular a cloud computer or a computer installed in a mobile device such as a mobile phone, on which the program is running or into the memory of which the program is loaded; and a signal wave, in particular a digital signal wave, carrying information which represents the program, in particular the aforementioned program, which in particular comprises code means which are adapted to perform the method steps according to any one of the aforementioned embodiments.

Definitions of Terms

The terminology used in the present disclosure is described in the following, wherein the following description also forms part of the present disclosure.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, in particular computer-readable data storage medium comprising computer-usable, in particular computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, in particular a data processing device comprising a digital processor (central processing unit or CPU) which executes the computer program elements, and optionally a volatile memory (in particular a random access memory or RAM) for storing data used for and/or produced by executing the computer program elements. Within the framework of the present invention, a computer-usable, in particular computer-readable data storage medium can be any data storage medium which can include, store, communicate, propagate or transport the program for use on or in connection with the instruction-executing system, apparatus or device. The computer-usable, in particular computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can in particular include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument).

It is the function of a marker to be detected by a detection unit (for example, a camera or an ultrasound receiver or analytical devices such as CT or MRI) in such a way that information about its spatial position (i.e. its spatial location and/or alignment) can be acquired. The detection unit is in particular part of a navigation system. The markers can be active markers. An active marker can for example emit electromagnetic radiation and/or waves which can be in the infrared, visible and/or ultraviolet spectral range. The marker can also however be passive, i.e. can for example reflect electromagnetic radiation in the infrared, visible and/or ultraviolet spectral range or can block x-ray radiation (i.e. it can be radiopaque). To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

In the field of medicine, medical imaging methods are used to generate medical image data (for example, two-dimensional or three-dimensional image data) comprising medical image information, such as for example image representations of anatomical structures (such as soft tissues, bones, organs, etc.) of the human body. The term "medical imaging methods" is understood to mean (advantageously apparatus-based) imaging methods (so-called medical imaging modalities and/or radiological imaging methods), such as for instance computed tomography (CT) and cone beam computed tomography (CBCT, in particular volumetric CBCT), x-ray tomography, magnetic resonance tomography (MRT or MRI), conventional x-ray, sonography and/or ultrasound examinations, and positron emission tomography. Analytical devices in particular are used to generate the medical image data in apparatus-based imaging methods. The medical imaging methods are in particular used for medical diagnostics, to analyse the anatomical body in order to generate images which are described by the image data. Medical imaging methods are also in particular used to detect pathological changes in the human body.

The method in accordance with the invention is in particular a data processing method. The data processing method is preferably performed using technical means, in particular a computer. The data processing method is in particular executed by or on the computer. The computer in particular comprises a processor and a memory in order to process the data, in particular electronically and/or optically. The calculating steps described are in particular performed by a computer. Determining steps or calculating steps are in particular steps of determining data within the framework of the technical data processing method, in particular within the framework of a program. A computer is in particular any kind of data processing device, in particular electronic data processing device. A computer can be a device which is generally thought of as such, for example desktop PCs, notebooks, netbooks, etc., but can also be any programmable apparatus, such as for example a mobile phone or an embedded processor. A computer can in particular comprise a system (network) of "sub-computers", wherein each sub-computer represents a computer in its own right. The term "computer" includes a cloud computer, in particular a cloud server. The term "cloud computer" includes a cloud computer system which in particular comprises a system of at least one cloud computer and in particular a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. In particular, the term "cloud" is used in this respect as a metaphor for the Internet (world wide web). In particular, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer in particular comprises interfaces in order to receive or output data and/or perform an analogue-to-digital conversion. The data are in particular data which represent physical properties and/or are generated from technical signals. The technical signals are in particular generated by means of (technical) detection devices (such as for example devices for detecting marker devices) and/or (technical) analytical devices (such as for example devices for performing imaging methods), wherein the technical signals are in particular electrical or optical signals. The technical signals in particular represent the data received or outputted by the computer.

The expression "acquiring data" in particular encompasses (within the framework of a data processing method) the scenario in which the data are determined by the data processing method or program. Determining data in particular encompasses measuring physical quantities and transforming the measured values into data, in particular digital data, and/or computing the data by means of a computer and in particular within the framework of the method in accordance with the invention. The meaning of "acquiring data" also in particular encompasses the scenario in which the data are received or retrieved by the data processing method or program, for example from another program, a previous method step or a data storage medium, in particular for further processing by the data processing method or program. The expression "acquiring data" can therefore also for example mean waiting to receive data and/or receiving the data. The received data can for example be inputted via an interface. The expression "acquiring data" can also mean that the data processing method or program performs steps in order to (actively) receive or retrieve the data from a data source, for instance a data storage medium (such as for example a ROM, RAM, database, hard drive, etc.), or via the interface (for instance, from another computer or a network). The data can be made "ready for use" by performing an additional step before the acquiring step. In accordance with this additional step, the data are generated in order to be acquired. The data are in particular detected or captured (for example by an analytical device). Alternatively or additionally, the data are inputted in accordance with the additional step, for instance via interfaces. The data generated can in particular be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, in particular determining data, does not involve a surgical step and in particular does not involve a step of treating a human or animal body using surgery or therapy. The data are for example embodied by magnetic or optical information stored in magnetic or optical data storage media. The data comprise information which describes certain quantities, in particular physical quantities, as in particular disclosed herein.

DESCRIPTION OF THE FIGURES

In the following, the invention is described with reference to the figures which represent preferred embodiments of the invention, though without limiting the invention to the specific features shown in the figures.

FIG. 1 shows a frontal plane view of a human brain in which an example of a known connection 1 within the brain is indicated. Other known structures and regions indicated are the substantia nigra 2, the subthalamic nucleus 3, the globus pallidus 4 and 5, the putamen 6, the caudate nucleus 7 and the thalamus 8. As is apparent in FIG. 1, the subthalamic nucleus 3 is a small structure and thus difficult to identify as a target. Identifying such small structures within the human brain can be significantly improved using the present invention.

As shown in FIG. 2, the target entity T is connected to eight other entities ($E_1$ to $E_8$) within the brain, thus defining an eight-dimensional feature space. A plurality of candidate entities $C_1$ and $C_2$ can be chosen, either manually or automatically, to be compared with the target entity T on the basis of one or more similarity features.

As shown in FIG. 3, a three-dimensional feature space is determined which represents a probability of the target entity T being connected to three other entities within the brain. For example, the X axis can represent the connectivity between the entities under consideration and the thalamus, the Y axis can represent the probability of the entities under consideration being connected to the globus pallidus, and the Z axis can represent the probability of the entities under consideration being connected to the motor cortex. Moreover, a value for a specific entity in each dimension indicates the probability of said entity being connected to the respective other entities. For example, the candidate entity $C_1$ has a higher X-axis value than the candidate entity $C_2$, hence the probability of the candidate entity $C_1$ being connected to the thalamus is higher than the probability that the candidate entity $C_2$ is connected to the thalamus. Using DTI-based tractography, the position of the candidate entities $C_1$ and $C_2$ can be determined within the three-dimensional feature space and compared with the corresponding position of the target entity T, which is known beforehand. The Euclidian distance between the respective points in the feature space provides information about the similarity between each of the candidate entities and the target entity. The shorter the distance between the respective candidate entity and the target entity, the greater their similarity and therefore the higher the probability that the candidate entity under consideration represents the target entity.

Figure 1:
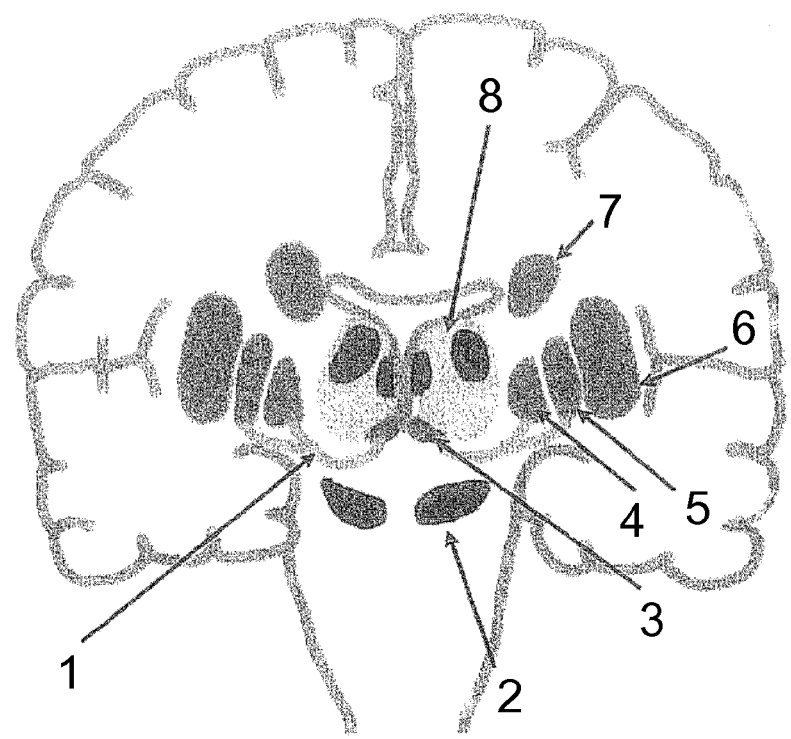
FIG. 1 shows an example of a known anatomical connectivity pattern and the approximate location of the subthalamic nucleus.
Figure 2:
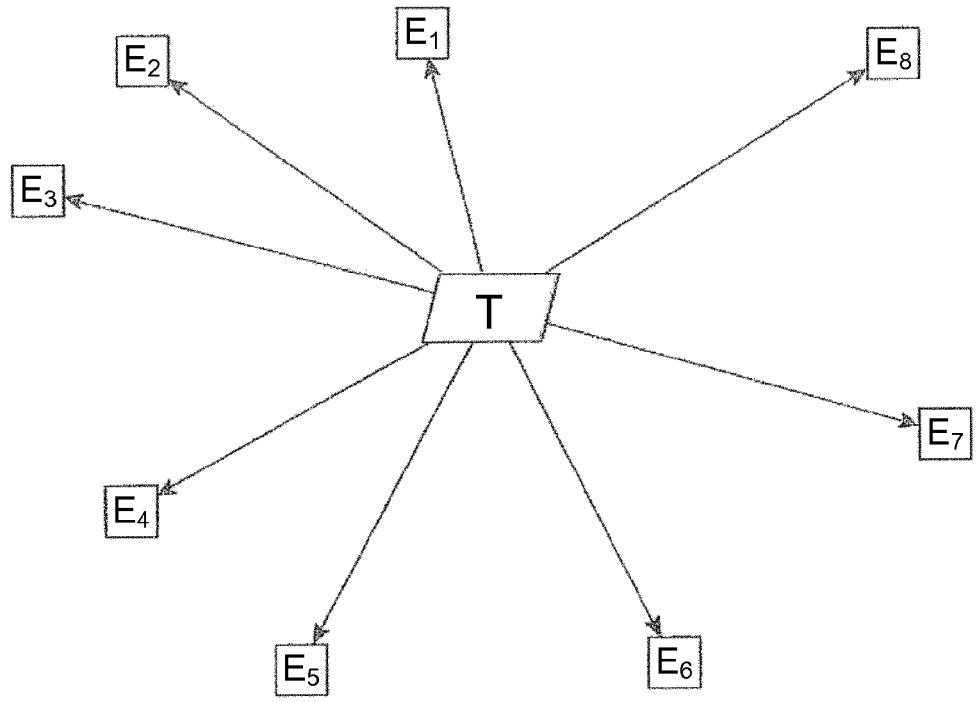
FIG. 2 schematically shows the connections between a target entity T and eight other entities $E_1$ to $E_8$.
Figure 3:
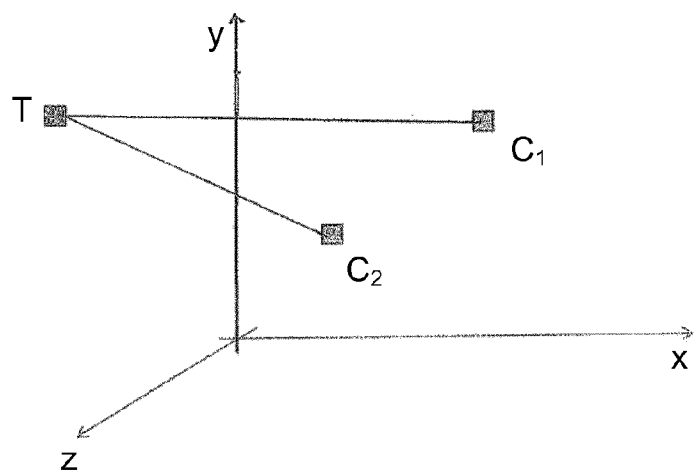
FIG. 3 shows the similarity between two candidate entities $C_1$ and $C_2$ and a target entity T in a three-dimensional feature space.
Figure 4:
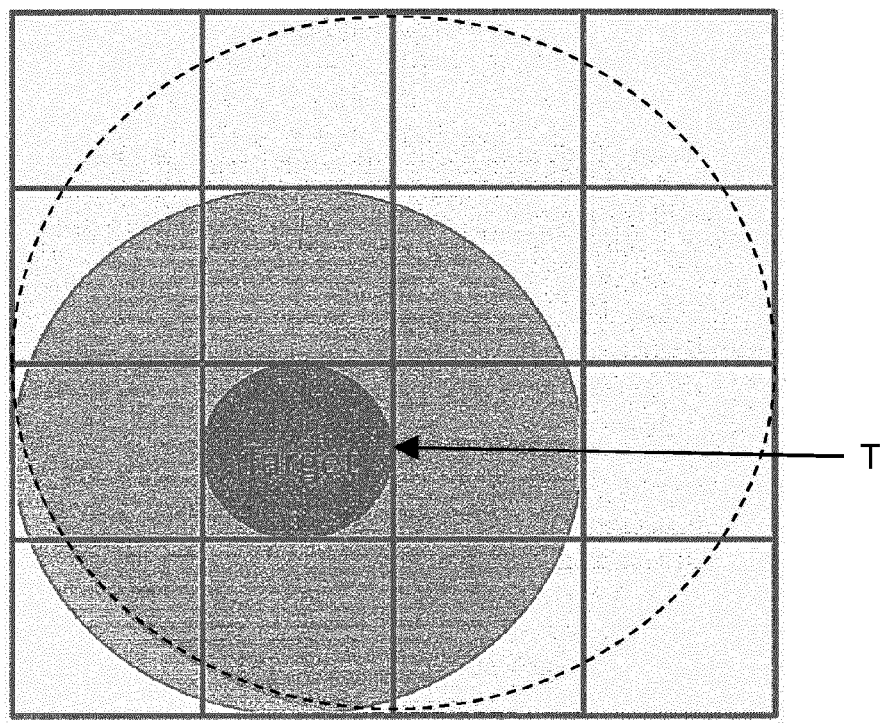
FIG. 4 shows how translating the similarity between connectivity profiles into voxel-specific ratings results in a probability field which describes the likelihood that a given voxel is the target voxel in question. In the example shown in FIG. 4, each of the 16 voxels has a certain similarity to the target voxel (indicated by the circle shown by a broken line), nine voxels show a higher degree of similarity to the target voxel (represented by the light grey circle), while only one candidate voxel has a very high degree of similarity to the target voxel (represented by the dark grey circle within a single voxel). It can therefore be assumed that this latter voxel represents the target voxel.

The invention claimed is:

1. A medical image analysis system for identifying an entity of the nervous system, comprising:
a computer having one or more processors operable to execute instructions in memory, the instructions operable for:
receiving by the processor target connectivity data including target connectivity information about the probability of a target entity being connected to other entities of the nervous system;
wherein the target connectivity data includes at least a target connectivity data image data set and can be at least one voxel, region or structure within the target connectivity data image data set;
receiving by the processor candidate connectivity data including candidate connectivity information about a probability of one of a plurality of candidate entities being connected to other entities of the nervous system;
wherein the candidate connectivity data includes at least a candidate connectivity data image data set and can be a at least one voxel, region or structure within the candidate connectivity data image data set; and
determining, by the instructions operating on the at least one processor, similarity data for each of the plurality of candidate entities on the basis of the candidate connectivity data and the target connectivity data, wherein the similarity data comprise similarity information about the similarity between the candidate entity and the target entity, wherein criteria are defined to find the candidate entity from the plurality of candidate entities which most likely represents the target entity.

2. A medical image analysis system, comprising a computer having a processor configured to execute a computer-implemented medical image analysis method for identifying an entity of the nervous system, of a patient, wherein the method comprises the following steps:
a) receiving, at the processor, target connectivity data comprising target connectivity information about the probability of a target entity being connected to other entities of the nervous system;
b) receiving, at the processor, candidate connectivity data comprising candidate connectivity information about a probability of one of a plurality of candidate entities being connected to other entities of the nervous system; and
c) determining, by the processor, similarity data for each of the plurality of candidate entities on the basis of the candidate connectivity data and the target connectivity data, wherein the similarity data comprise similarity information about the similarity between the candidate entity and the target entity, wherein criteria are defined to find the candidate entity from the plurality of candidate entities which most likely represents the target entity.

3. A computer implemented medical image analysis method for identifying an entity of the nervous system of a patient, the method executed by a computer having a processor, comprising:
a) receiving, at the processor, target connectivity data comprising target connectivity information about the probability of a target entity being connected to other entities of the nervous system;
b) receiving, at the processor, candidate connectivity data comprising candidate connectivity information about a probability of one of a plurality of candidate entities being connected to other entities of the nervous system; and
c) determining, by the processor, similarity data for each of the plurality of candidate entities on the basis of the candidate connectivity data and the target connectivity data, wherein the similarity data comprise similarity information about the similarity between the candidate entity and the target entity, wherein criteria are defined to find the candidate entity from the plurality of candidate entities which most likely represents the target entity.

4. The method according to claim 3, wherein the connectivity information comprises information about at least one of the anatomical connectivity probability and the functional connectivity probability.

5. The method according claim 3, wherein the at least one candidate entity is constituted by a voxel, a region or a structure within a data set of the nervous system.

6. The method according to claim 5, wherein the data set is an image data set which is in particular obtained by diffusion tensor imaging (DTI)-based tractography.

7. The method according to claim 3, wherein the target entity is constituted by a voxel, a region or a structure within a previously acquired medical image data set obtained by DTI-based tractography.

8. The method according to claim 3, wherein a feature space is determined which comprises n dimensions for n connectivity features assigned to the target entity, wherein each of the features describes the connectivity probability between the target entity and another entity which is constituted by a voxel, a region or a structure.

9. The method according to claim 8, wherein a connectivity vector is determined for each of the at least one candidate entities and the target entity, wherein the connectivity vector comprises n dimensions and is based on the connectivity information about the assigned entity.

10. The method according to claim 3, wherein the similarity data comprise similarity information about the similarity between the target entity and the at least one candidate entity, such as the similarity between the connectivity vector assigned to the target entity and the connectivity vector(s) assigned to the at least one candidate entity.

11. The method according to claim 10, wherein the similarity data are determined by determining distance data which comprises distance information about the distance between the end points of the connectivity vectors in the feature space.

12. The method according to claim 11, wherein the distance is constituted by a measure of distance which is obtained from a plurality of subjects.

13. The method according to claim 3, wherein the connectivity information acquired comprises information about direct-path connectivity and/or indirect-path connectivity.

14. The method according to claim 3, wherein probability data are determined on the basis of at least one logical query which provides at least one criterion for considering and/or excluding one or more candidate entities.

15. The method according to claim 3, wherein an elastic fusion procedure, is performed on an image data set of the nervous system on the basis of the similarity data determined.

16. The method according claim 3, wherein a map of the nervous system is created on the basis of the similarity data determined.

17. A non-transitory computer readable program storage medium storing a computer program which, when executed on a processor of a computer or loaded into the memory of a computer, causes the computer to perform a computer-implemented method for identifying an entity of the nervous system of a patient the method comprising:
 a) receiving, at the processor, target connectivity data comprising target connectivity information about the probability of a target entity being connected to other entities of the nervous system;
 b) receiving, at the processor, candidate connectivity data comprising candidate connectivity information about a probability of one of a plurality of candidate entities being connected to other entities of the nervous system; and
 c) determining, by the processor, similarity data for each of the plurality of candidate entities on the basis of the candidate connectivity data and the target connectivity data, wherein the similarity data comprise similarity information about the similarity between the candidate entity and the target entity, wherein criteria are defined to find the candidate entity from the plurality of candidate entities which most likely represents the target entity.

18. A computer comprising the non-transitory computer-readable program storage medium according to claim 17.

* * * * *